US007527082B2

(12) United States Patent
Fukunaga (10) Patent No.: US 7,527,082 B2
(45) Date of Patent: May 5, 2009

(54) PNEUMATIC TIRE WITH OUTERMOST CIRCUMFERENTIAL GROOVES HAVING ZIGZAG BOTTOMS

(75) Inventor: Takayuki Fukunaga, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 63 days.

(21) Appl. No.: 10/558,618

(22) PCT Filed: May 26, 2004

(86) PCT No.: PCT/JP2004/007187

§ 371 (c)(1),
(2), (4) Date: Nov. 28, 2005

(87) PCT Pub. No.: WO2004/106091

PCT Pub. Date: Dec. 9, 2004

(65) Prior Publication Data

US 2007/0006955 A1    Jan. 11, 2007

(30) Foreign Application Priority Data

May 28, 2003    (JP)    ............... 2003-150587

(51) Int. Cl.
*B60C 11/13*    (2006.01)
(52) U.S. Cl. ............... 152/209.24; 152/209.28
(58) Field of Classification Search ............ 152/209.15, 152/209.18, 209.21, 209.24, 209.28
See application file for complete search history.

(56) References Cited

U.S. PATENT DOCUMENTS

| 2,604,920 | A | * | 7/1952 | Kirby | ............... | 152/209.18 |
| 4,114,671 | A | * | 9/1978 | Maiocchi et al. | ....... | 152/209.21 |
| 4,796,683 | A | * | 1/1989 | Kawabata et al. | ...... | 152/209.24 |
| 2002/0062892 | A1 | * | 5/2002 | Himuro | ................. | 152/209.18 |
| 2005/0092413 | A1 | * | 5/2005 | Miyazaki | ............... | 152/209.24 |

FOREIGN PATENT DOCUMENTS

EP        1075971    *   2/2001

(Continued)

*Primary Examiner*—Steven D Maki
(74) *Attorney, Agent, or Firm*—Sughrue Mion, PLLC (57) ABSTRACT

A pneumatic tire which has improved drainage property on a wet road surface and improved uneven wear resistance and steering stability on a dry road surface while enhancing drainage property on a wet road surface. The tire has at least a pair of circumferential grooves 2 disposed at a tread portion 1. An inner land portion 3 and an outer land portion 4 are defined by outermost circumferential grooves 2*a*. A plurality of transverse grooves 5 are disposed on at least the outer land portion 4 and the outer land portion 4 is divided and formed into a large number of blocks by these transverse grooves 5. The width $w_1$ of the groove bottom 6 of the outermost circumferential groove 2*a* is narrower than the opening width $w_2$. The groove bottom extends with inclination with respect to the tire circumferential direction so that it substantially continues to the transverse groove between the adjacent transverse grooves. The groove bottom forms the zigzag shape as a whole. The outermost circumferential groove 2*a* has chamfered parts 10, 11 on each of the inner and the outer groove walls 7, 8 which is inclined with certain angles $\theta_1$, $\theta_2$ from the opening end edge 9*a*, 9*b* toward the groove bottom 6, respectively. The chamfered widths $c_1$, $c_2$ of the chamfered parts are gradually increased in the opposite orientations in the circumferential direction.

9 Claims, 7 Drawing Sheets

FOREIGN PATENT DOCUMENTS

| | | | |
|---|---|---|---|
| JP | 61-200007 | * | 6/1986 |
| JP | 01-204805 | * | 8/1989 |
| JP | 01-204805 A | | 8/1989 |
| JP | 3-065407 A | | 3/1991 |
| JP | 2000-043514 A | | 2/2000 |
| JP | 2000-247111 A | | 9/2000 |
| JP | 2000-272307 A | | 10/2000 |
| JP | 2001-026205 A | | 1/2001 |
| JP | 2001-071709 | * | 3/2001 |

* cited by examiner

PRIOR ART

PNEUMATIC TIRE WITH OUTERMOST CIRCUMFERENTIAL GROOVES HAVING ZIGZAG BOTTOMS

TECHNICAL FIELD

The present invention relates to a pneumatic tire and particularly to a pneumatic tire which has excellent drainage property on a wet road surface and uneven wear resistance and steering stability on a dry road surface.

RELATED ART

It has been known that in order to improve drainage property on a wet road surface, it is effective to increase the groove volume by enlarging the groove width and/or the groove depth. However, the increased groove volume may involve a smaller ground contact area and/or an insufficient rigidity of the land portions, and results in a problem of lowering the steering stability and uneven wear resistance on a dry road surface. On the contrary, in order to improve steering stability and uneven wear resistance on a dry road surface, it is effective to increase the ground contact area or to increase the land portion rigidity by reducing the groove area, but these approaches may involve a smaller groove volume and results in a problem of lowering drainage property on a wet road surface.

In order to solve the above-mentioned problem, JP-A-01-204805 describes a pneumatic tire having at least a pair of circumferential main grooves, plural lateral main grooves and land portions provided with acute-angle corner parts and obtuse-angle corner parts defined by the circumferential main grooves and the lateral main grooves, in which the block rigidities of the acute-angle corner part and the obtuse-angle corner part are made uniform by gradually increasing an inclination angle of the side wall of the land portion from the obtuse-angle corner part having the substantially smallest inclination angle toward the acute-angle corner part having the substantially largest inclination angle with respect to the normal direction at this position so as to suppress generation of uneven wear, and drainage property is improved by making the groove bottom width smooth and continuous. However, this tire is so constructed that the groove bottom extends along the tire circumferential direction, and water flowing through this groove bottom and the water flowing through the lateral groove tend to collide at the intersection of the grooves and cause a turbulent flow. Thus, sufficient drainage property cannot be obtained.

JP-A-03-213405 discloses a tire having a directional pattern made of a zigzag-state circumferential groove and a lateral groove extending from the tread end to the tire equator and whose uneven wear resistance is improved while maintaining its drainage property by making the groove bottom of the circumferential groove in generally parallel to the tire circumferential direction. This tire, however, has a construction in which the groove bottom extends along the tire circumferential direction, so that the water flowing through this groove bottom and the water flowing through the lateral groove collide with each other at the intersection of the grooves and causes a turbulent flow. Thus, sufficient drainage property cannot be obtained.

JP-A-02-241805 describes a tire having a block land portion at a shoulder portion and whose uneven wear resistance and steering stability are improved by making angles of the side walls of the block land portion with respect to the tire equatorial plane different between the step-in side and step-out side. In this tire, however, the sectional area in the tire width direction of the circumferential groove is largely changed along the tire circumferential direction, and the water flowing through the circumferential groove tends to cause a turbulent flow. Moreover, in the side wall of the block land portion disposed at the shoulder portion, the side with a larger angle with respect to the tire equatorial plane (step-in side) has an angle of the corner part formed by the circumferential groove and the transverse groove decreased toward the groove bottom, which lowers local rigidity and uneven wear resistance.

DISCLOSURE OF THE INVENTION

Therefore, an object of the present invention is to provide a pneumatic tire which is excellent in drainage property on a wet road surface and uneven wear resistance and steering stability on a dry road surface by optimizing a tread pattern.

In order to achieve the above-mentioned object, the present invention is a pneumatic tire in which at least a pair of circumferential grooves extending along the tire circumferential direction are disposed at a tread portion, an inner land portion and an outer land portion are defined by disposition of the outermost circumferential grooves, which are the circumferential grooves located at the outermost in the tire width direction among these circumferential grooves, a plurality of transverse grooves extending with inclination with respect to the tire circumferential direction are disposed on at least the outer land portion and the outer land portion is divided and formed into a large number of blocks by these transverse grooves, said tire being characterized in that the outermost circumferential groove has its both opening end edges extending along the tire circumferential direction, the width of the groove bottom is narrower than the opening width, the groove bottom extends with inclination with respect to the tire circumferential direction so that it substantially continues to the transverse groove disposed on the outer land portion between the adjacent transverse grooves, the groove bottom forms the zigzag shape as a whole and a chamfered part is provided on each of the inner and the outer groove walls which is inclined with a certain angle from the opening end edge toward the groove bottom, respectively and the chamfered widths of the chamfered parts are gradually increased in the opposite orientations in the circumferential direction.

Also, it is preferable that an angle formed by the inner chamfered part and the plane including the tire circumferential direction is within the range of 15 to 80 degrees measured from the acute-angle side.

Moreover, it is preferable that an angle formed by the outer chamfered part and the plane including the tire circumferential direction is within the range of 15 to 80 degrees measured from the acute-angle side.

Furthermore, it is preferable that an angle formed by the inner end edge of the groove bottom located at the outermost circumferential groove between the adjacent transverse grooves and the plane including the tire circumferential direction is within the range of 5 to 45 degrees measured from the acute-angle side on the inner land portion side.

In addition, it is preferable that an angle formed by the outer end edge of the groove bottom of the outermost circumferential groove located between the adjacent transverse grooves and the plane including the tire circumferential direction is within the range of 5 to 45 degrees measured from the acute-angle side on the outer land portion side.

Moreover, it is preferable that the chamfered surface of the inner and outer chamfered parts has a flat plane generally in the triangle shape.

Furthermore, it is preferable that the circumferential groove includes a pair of the outermost circumferential grooves located with the tire equatorial plane between them, and the groove bottom of this pair of the outermost circumferential grooves located between the adjacent transverse grooves and the transverse groove extending to the opening at the tread end in communication with each of them are disposed so that they are entered within a ground contact area sequentially from the tire equator side to the tread end side at rolling of the tire load.

BEST MODE FOR CARRYING OUT THE INVENTION

Figure 1:
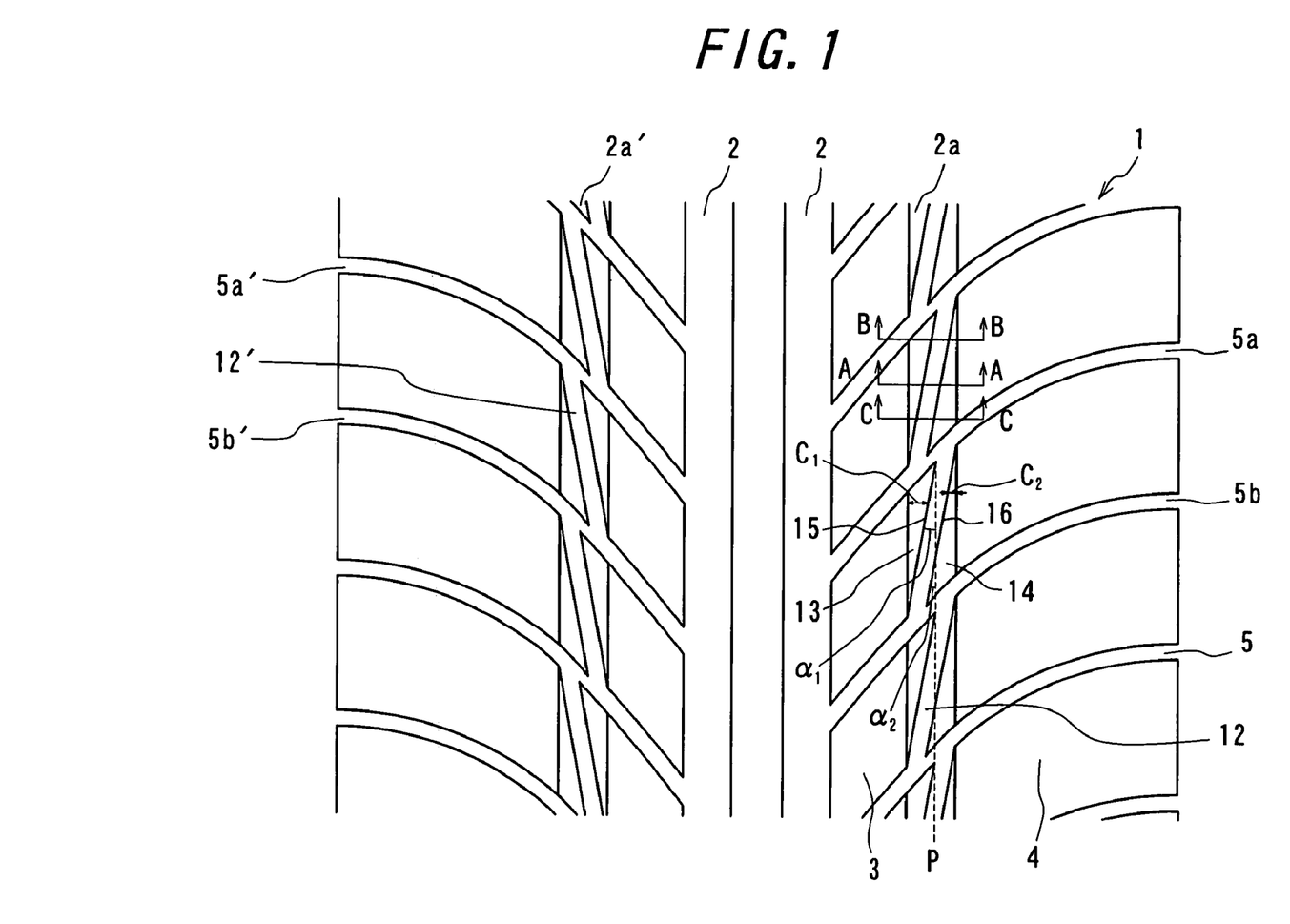
FIG. 1 is an extended view of an essential part of a tread portion of a typical pneumatic tire according to the present invention.
Figure 2A:
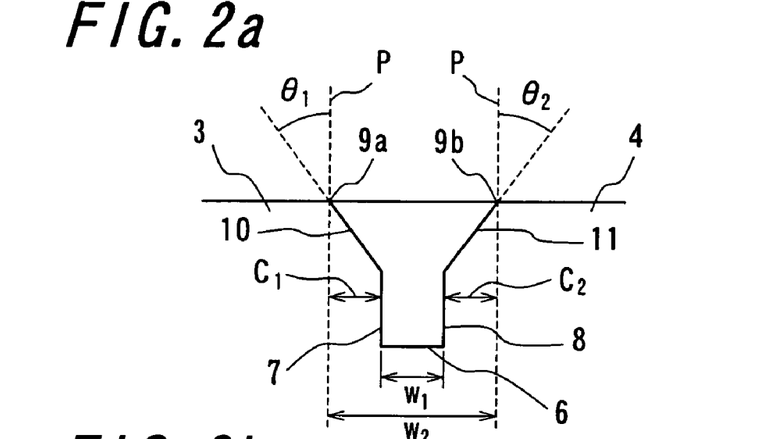
FIGS. 2(a), (b) and (c) are sectional views taken along A-A line, B-B line and C-C line in FIG. 1, respectively.
Figure 2B:
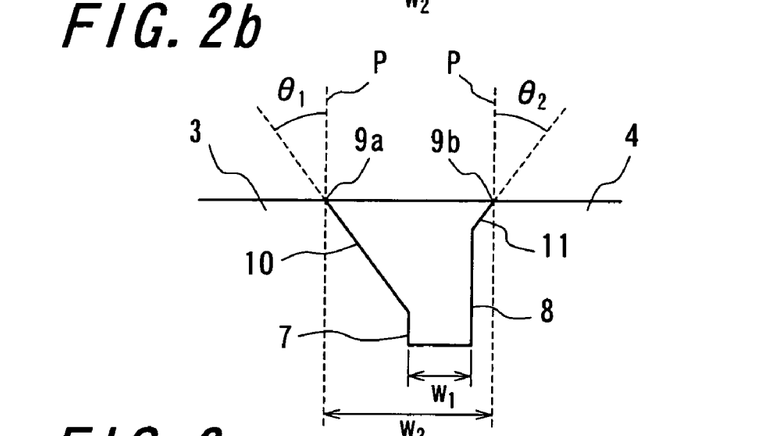
Figure 2C:
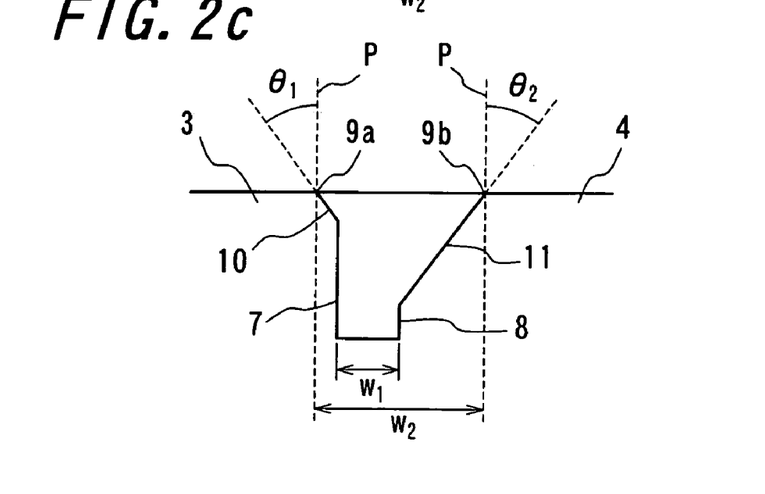

A best mode for carrying-out of the present invention will be described referring to the drawings. FIG. 1 shows a part of an extended view of a tread portion of a typical pneumatic tire (hereinafter referred to as "tire") according to the present invention, and FIGS. 2(a), (b) and (c) are sectional views taken along A-A line, B-B line and C-C line in FIG. 1, respectively.

The tire shown in FIG. 1 has at least a pair, two pairs in FIG. 1, of circumferential grooves 2, 2a and 2a' which extend along the tire circumferential direction and are disposed on a tread portion 1. Among these circumferential grooves 2, 2a and 2a', the grooves 2a and 2a' are the outermost circumferential grooves which are circumferential grooves located at the outermost side in the tire width direction. By disposing these outermost circumferential grooves 2a and 2a', an inner land portion 3 and an outer land portion 4 are defined. A plurality of transverse grooves 5 extending with inclination with respect to the tire circumferential direction are disposed on at least the outer land portion 4, and the outer land portion 4 is divided and formed into a large number of blocks by these transverse grooves 5.

And a major characteristic in construction of the present invention is to optimize the outermost circumferential grooves 2a and 2a'. In concrete, the outermost circumferential grooves 2a and 2a' have both opening end edges 9a and 9b extending along the tire circumferential direction, the width $w_1$ of a groove bottom 6 is narrower than the opening width $w_2$, the groove bottom 6 extends with inclination with respect to the tire circumferential direction so that it substantially continues to a transverse groove 5a disposed at the outer land portion 4 between the adjacent transverse grooves 5a and 5b, the groove bottom 6 forms the zigzag shape as a whole, and chamfered parts 10 and 11 with inclination of certain angles $\theta_1$ and $\theta_2$ from opening end edges 9a and 9b to the groove bottom 6, respectively, and whose chamfer widths $c_1$ and $c_2$ are gradually increased in the opposing orientations in the circumferential direction are provided on both groove walls of inner and outer groove walls 7 and 8.

In the next, it will be discussed, along with its operation, how the present invention has adopted the above construction.

Generally, the more the groove volume is increased by increasing the groove width and/or groove depth, the more drainage property on a wet road surface is improved. The increase of the groove volume, however, inevitably results in lowered rigidity of the land portion, and steering stability and uneven wear resistance on a dry road surface are undermined. On the contrary, the larger the land portion rigidity is made, the more steering stability and uneven wear resistance on a dry road surface are improved, but this inevitably results in lowered groove volume, and drainage property on a wet road surface is lost. That is, it has been considered that the drainage property on a wet road surface and the steering stability and uneven wear resistance on a dry road surface are in the trade-off relation.

The inventor has examined improvement of drainage property on a wet road surface while maintaining land portion rigidity. As a result, the inventor has come up with an idea that, if both the opening end edges of the circumferential groove are disposed along the tire circumferential direction and the width of the groove bottom is made narrower than the opening width, the land portion volume can be effectively increased while keeping a drop rate of the drainage property small so that the land portion rigidity can be improved. Moreover, the inventor has come up with an idea that, if the groove bottom of the circumferential groove extends with inclination with respect to the tire circumferential direction so that it substantially continues to the transverse groove disposed at the outer land portion between the adjacent transverse grooves and has the zigzag shape as the entire groove bottom, water taken in the circumferential groove is quickly led into the transverse groove through the groove bottom of the circumferential groove, and a turbulent flow hardly occurs at the intersection part between the circumferential groove and the transverse groove, which improves drainage property. In addition, by providing chamfered parts inclined at a certain angle from the opening end edge to the groove bottom, respectively, and having chamfered widths gradually increased in the opposing circumferential directions on both the inner and outer groove walls, the opening width of the circumferential groove can be effectively widened while suppressing generation of a corner part with a small angle which causes the uneven wear resistance of the land portion to drop, and water existing on the ground contact surface of the tread can be quickly taken into the circumferential groove. Also, the inventor has found out that the water flowing through the circumferential groove is prevented from becoming a turbulent flow since the variation width of the sectional area in the tire width direction of the circumferential groove along the tire circumferential direction is small, and the drainage property is further improved. The present invention has been completed in this way.

It is preferable that the angle $\theta_1$ formed by the inner chamfered part 10 and a plane P including the tire circumferential direction is within a range of 15 to 80 degrees measured from the acute-angle side. If $\theta_1$ is less than 15 degrees, the land portion volume of the inner land portion 3 is drastically decreased, and the land-part rigidity is lowered and the steering stability and uneven wear resistance become insufficient. If $\theta_1$ exceeds 80 degrees, the groove volume in the outermost circumferential groove 2a is drastically decreased, and water discharge efficiency is lowered and the drainage property on a wet road surface becomes insufficient.

Also, it is preferable that the angle $\theta_2$ formed by the outer chamfered part 11 and the plane P including the tire circumferential direction is within a range of 15 to 80 degrees measured from the acute-angle side. If $\theta_2$ is less than 15 degrees, the land portion volume of the outer land portion 4 is drastically decreased, and the land-part rigidity is lowered to make the steering stability and uneven wear resistance insufficient.

If $\theta_2$ exceeds 80 degrees, the groove volume in the outermost circumferential groove 2a is drastically decreased, and water discharge efficiency is lowered to make the drainage property on a wet road surface insufficient. Furthermore, the outer chamfered part 11 inhibits water flow flowing through the transverse groove 5a disposed in the outer land portion 4 from the outermost circumferential groove 2a.

Moreover, it is preferable that an angle $\alpha_1$ formed by the inner end edge 15 of the groove bottom 12 of the outermost circumferential groove 2a located between the adjacent transverse grooves 5a and 5b and the plane P including the tire circumferential direction is within the range of 5 to 45 degrees measured from the acute-angle side. If $\alpha_1$ is less than 5 degrees, the water flowing on the groove bottom side in the outermost circumferential groove 2a cannot smoothly flow into the transverse groove 5a disposed at the outer land portion 4 and sufficient drainage property cannot be obtained. If it exceeds 45 degrees, the water in the outermost circumferential groove 2a cannot smoothly flow in the tire circumferential direction, and sufficient drainage property cannot be obtained, either. Furthermore, considering continuity from the groove bottom 6 of the outermost circumferential groove 2a to the transverse groove 5a disposed at the outer land portion 4, the disposition pitch of the block of the outer land portion 4 must be made smaller, the land portion rigidity is lowered and the uneven wear resistance and steering stability deteriorate.

In addition, it is preferable that an angle $\alpha_2$ formed by the outer end edge 16 of the groove bottom 12 of the outermost circumferential groove 2a located between the adjacent transverse grooves 5a and 5b and the plane P including the tire circumferential direction is within the range of 5 to 45 degrees measured from the acute-angle side on the outer land portion side. If $\alpha_2$ is less than 5 degrees, the water flowing on the groove bottom side in the outermost circumferential groove 2a cannot smoothly flow into the transverse groove 5a disposed at the outer land portion 4, and sufficient drainage property cannot be obtained. If it exceeds 45 degrees, the water in the outermost circumferential groove 2a cannot smoothly flow in the tire circumferential direction, and sufficient drainage property cannot be obtained, either. Furthermore, considering continuity from the groove bottom 6 of the outermost circumferential groove 2a to the transverse groove 5a disposed at the outer land portion 4, the disposition pitch of the block of the outer land portion 4 must be made smaller, the land portion rigidity is lowered and the uneven wear resistance and steering stability deteriorate.

Moreover, the chamfered surfaces 13 and 14 of the inner and outer chamfered parts 10, 11 preferably have a flat plane generally in the triangular shape. The flat plane generally in the triangular shape is adopted in order to prevent the water flow in the vicinity of the groove bottom 12 from being inhibited by the land portion and generating a turbulent flow.

In addition, it is preferable that the groove bottoms 12 and 12' located between the adjacent transverse grooves 5a and 5b, 5a' and 5b', respectively, of a pair of the outermost circumferential grooves 2a and 2a' located with the tire equatorial plane between them and the pair of transverse grooves 5a and 5a' extending to opening at the tread end in communication to each of them are disposed so that they enter the ground contact area sequentially from the tire equator side to the tread end side at rolling of the tire load. By constituting the tread pattern in a so-called directional pattern in this way, the water in the tread is more smoothly discharged outside the tread and the drainage property is improved.

Figure 3:
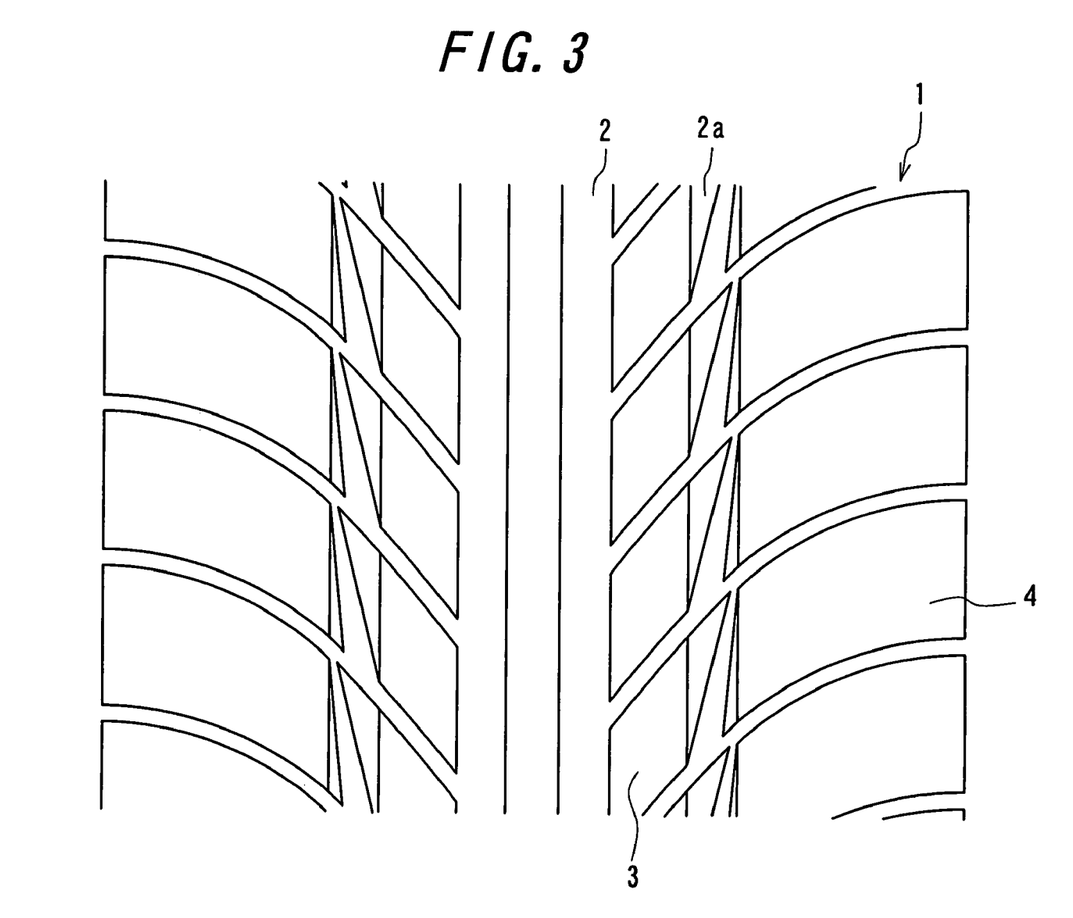
FIG. 3 is an extended view of an essential part of a tread portion of another tire according to the present invention.

The mentioned above shows only an example of the preferred embodiment of the present invention, and various modifications can be made in the claims. For example, FIG. 1 shows the preferred embodiment in which the angles $\alpha_1$ and $\alpha_2$ formed by the groove bottom 12 and the plane P including the tire circumferential direction are the same, but as shown in FIG. 3, these angles $\alpha_1$ and $\alpha_2$ may be made different from each other. Also, FIG. 1 shows the preferred embodiment in which the inner land portion 3 is a block row constituted by a large number of blocks, but as shown in FIG. 4, the inner land portion 3 may be a rib-state land portion continuously extending substantially in the tire circumferential direction.

EXAMPLES

Next, a pneumatic tire according to the present invention was manufactured by way of trial and its performance was evaluated, which will be described below.

Figure 4:
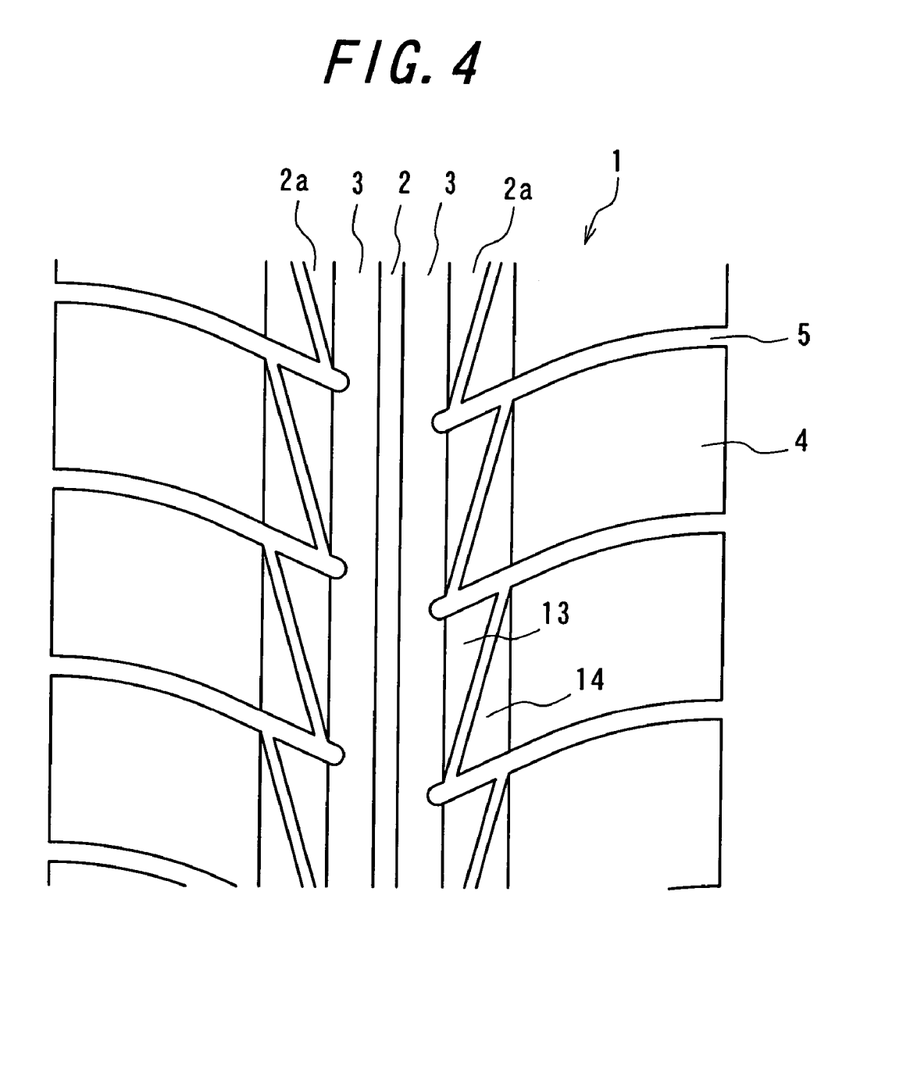
FIG. 4 is an extended view of an essential part of a tread portion of still another tire according to the present invention.

Tires of the Examples 1 and 2 are radial tires for a passenger vehicle with the tire size of 205/55R16, having a tread pattern shown in FIG. 1 and FIG. 4, respectively. The tires have the tread width of 140 mm, the groove depth of the outermost circumferential groove of 8 mm and the specification shown in Table 1.

Figure 5:
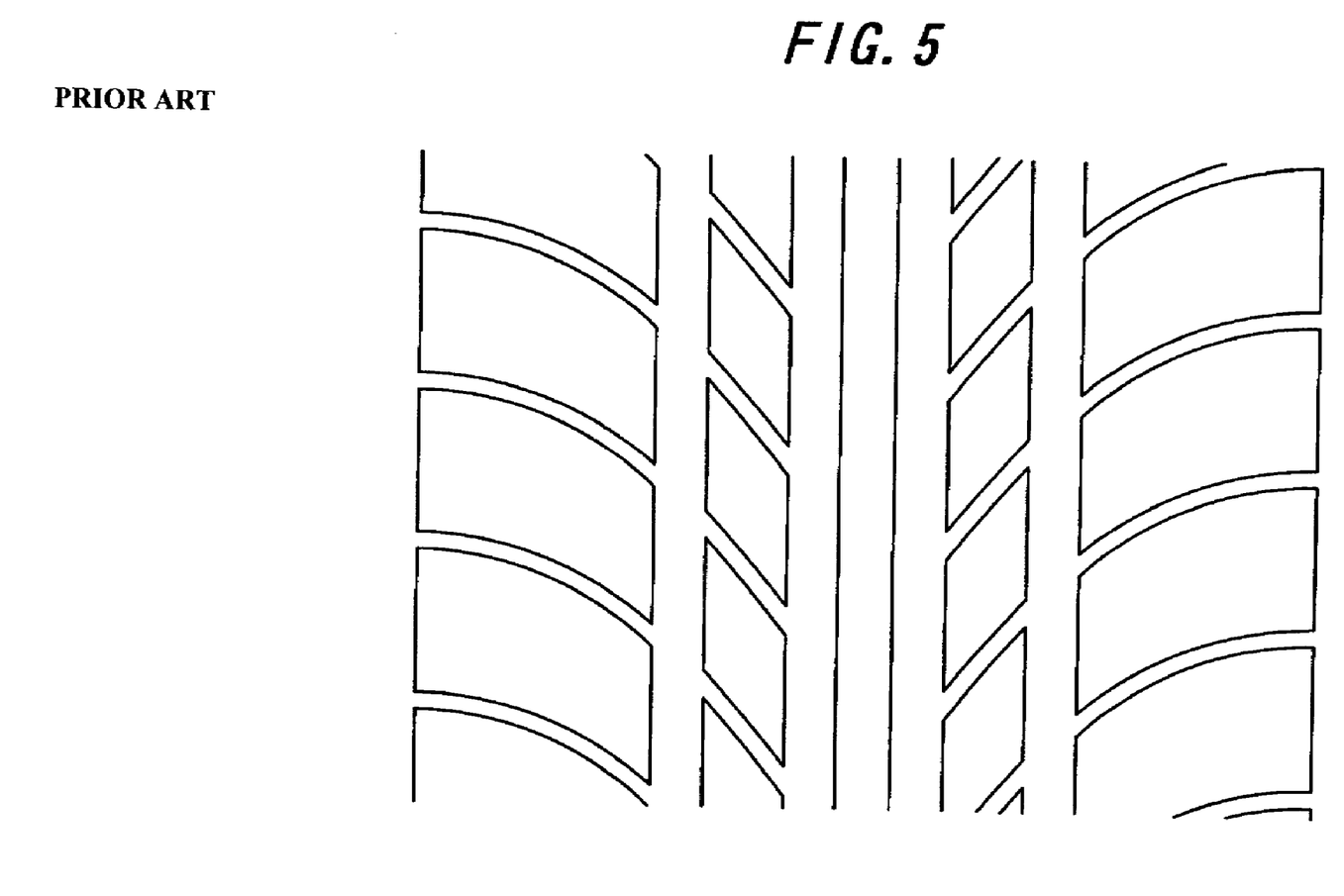
FIG. 5 is an extended view of an essential part of a tread portion of a tire of a conventional example.
Figure 6:
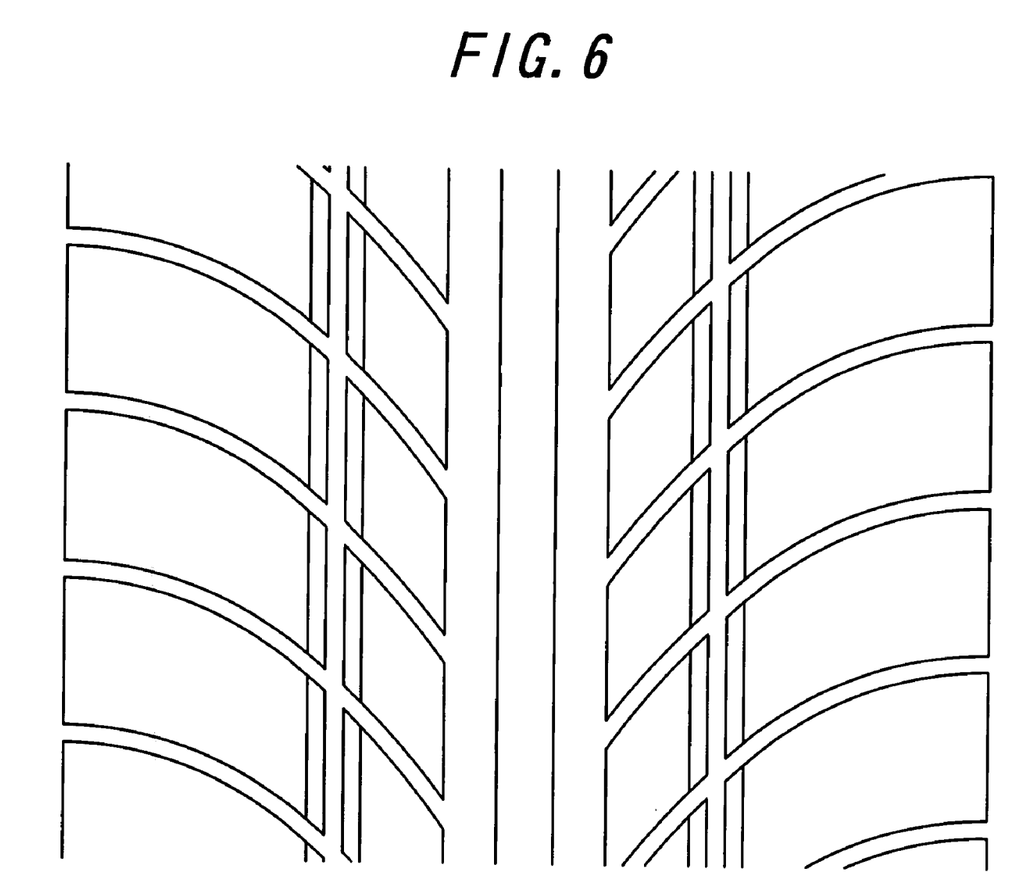
FIG. 6 is an extended view of an essential part of a tread portion of a tire of a comparative example 1.
Figure 7A:
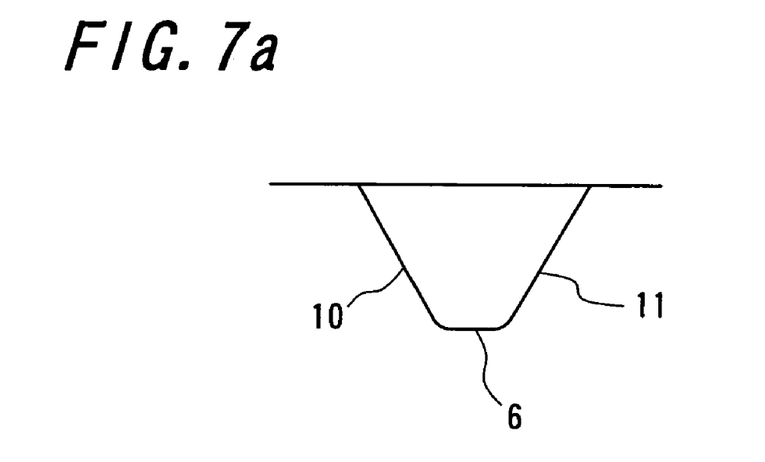
FIGS. 7(a), (b) and (c) are views for explaining the shape of both groove walls of the outermost circumferential groove of a comparative example 2.
Figure 7B:
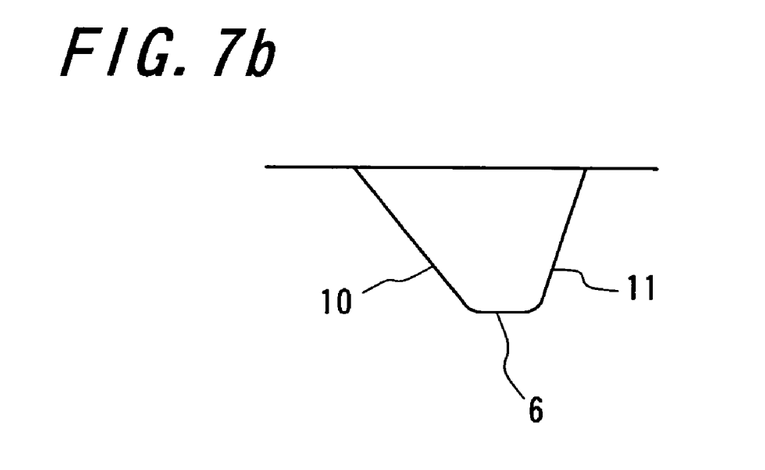
Figure 7C:
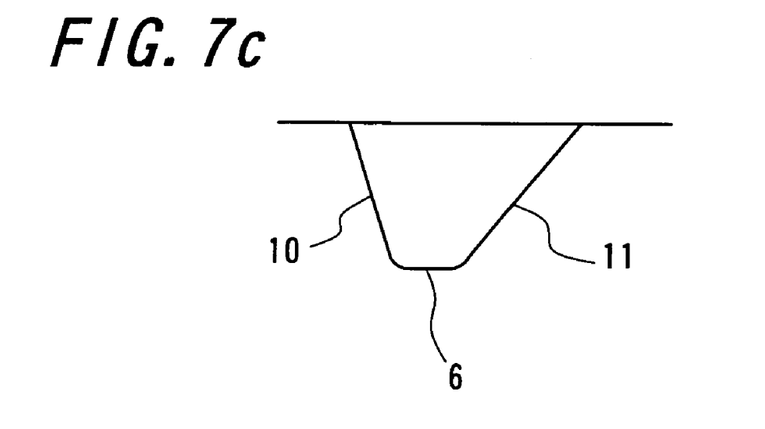

For comparison, tires having the same tire size, tread width and the groove depth of the outermost circumferential groove as those of the Examples 1 and 2 and having the specification shown in Table 1 and the tread pattern shown in FIG. 5 (Conventional Example), a tire having the tread pattern shown in FIG. 6 (Comparative Example 1) and a tire having the tread pattern shown in FIG. 1 but having the sectional shapes taken along A-A line, B-B line and C-C line in FIG. 1 as shown in FIGS. 7(a) to (c), respectively, (Comparative Example 2) were produced for trial.

(Testing Method)

Each of the above sample tires was mounted on a standard rim specified by JATMA (6 1/2JJ) to form a tire wheel. Each of the tire wheels was attached onto a front-wheel driven passenger vehicle so that the transverse groove and the groove bottoms of the outermost circumferential groove for the Comparative Example 2 and the Examples 1 and 2 enter the ground contact area sequentially from the tire equator side to the tread end at rolling on a tire load. Each of the following tests was conducted under the condition of air pressure of 220 kPa (relative pressure) and a tire load corresponding to two passengers seated on the front seats.

1. Drainage Property in Straight Running

The testing vehicle was made to run straight on a wet road surface with the water depth of 10 mm, a limit velocity at generation of the hydroplaning phenomenon was measured, and the drainage property was evaluated from this measured value. The evaluation results are shown in Table 1.

2. Drainage Property in Cornering

The testing vehicle was made to run at a corner on a wet road surface with the water depth of 6 mm and the radius of 80 m, a limit lateral G-force at generation of the hydroplaning phenomenon was measured, and the drainage property was evaluated from this measured value. The evaluation results are shown in Table 1.

3. Steering stability on a dry road surface

The testing vehicle was made to run in various running modes for sports running on a circuit course with a dry road surface, and feeling evaluation was made by a professional driver. The evaluation results are shown in Table 1.

4. Uneven Wear Resistance on a Dry Road Surface

After the testing vehicle was made to run for a certain distance on a predetermined route, a height difference between the adjacent land portions in the tire rotating direction of a tire at the same attachment position was measured, and uneven wear resistance was evaluated from this measured value. The evaluation results are shown in Table 1.

All the numerical values shown in the evaluation results in Table 1 are indicated for all the properties by index ratio with the conventional examples as 100, and larger the values is, the more superior the property is.

TABLE 1

| | Conventional Example | Comparative Example 1 | Comparative Example 2 | Example 1 | Example 2 |
|---|---|---|---|---|---|
| Groove bottom width $w_1$ of outermost circumferential groove | 13.4 mm | 4.0 mm | 4.8 mm | 4.8 mm | 1.0-8.2 mm |
| Opening width $w_2$ of outermost circumferential groove | 13.4 mm | 13.4 mm | 13.4 mm | 13.4 mm | 13.4 mm |
| Inclined angle $\theta_1$ of chamfered part | — | 25 deg | 0-56 deg | 45 deg | 58 deg |
| Inclined angle $\theta_2$ of chamfered part | — | 25 deg | 0-56 deg | 45 deg | 23 deg |
| Inclined angle $\alpha_1$ of groove bottom | 0 deg | 0 deg | 10 deg | 10 deg | 15 deg |
| Inclined angle $\alpha_2$ of groove bottom | 0 deg | 0 deg | 10 deg | 10 deg | 5 deg |
| Drainage property in straight running | 100 | 95 | 108 | 115 | 110 |
| Drainage property in cornering | 100 | 95 | 105 | 110 | 115 |
| Steering stability on dry road surface | 100 | 110 | 105 | 110 | 115 |
| Uneven wear resistance on dry road surface | 100 | 100 | 105 | 110 | 110 |

From the evaluation results shown in Table 1, it is indicated that the tires of the Examples 1 and 2 are superior to the tires of the Conventional Example and the Comparative Examples 1 and 2 in drainage property, steering stability and uneven wear resistance.

INDUSTRIAL APPLICABILITY

By the present invention, a pneumatic tire with excellent drainage property on a wet road surface and uneven wear resistance and steering stability on a dry road surface can be provided.

The invention claimed is:

1. A pneumatic tire in which at least a pair of circumferential grooves extending continuously along the tire circumferential direction are disposed at a tread portion, an inner land portion and an outer land portion are defined by disposition of the outermost circumferential grooves, which are the circumferential grooves located at the outermost in the tire width direction among these circumferential grooves, a plurality of transverse grooves extending with inclination with respect to the tire circumferential direction are disposed on at least the outer land portion and the outer land portion is divided and formed into a large number of blocks by these transverse grooves, said tire being characterized in that the outermost circumferential groove has its both opening end edges extending along the tire circumferential direction, the width of the groove bottom is narrower than the opening width, the groove bottom extends between adjacent transverse grooves disposed on the outer land portion with inclination with respect to the tire circumferential direction so that it substantially continues to one of the transverse grooves of the adjacent transverse grooves, the groove bottom forms the zigzag shape as a whole and a chamfered part is provided on both groove walls of the outer groove walls disposed on the blocks between the transverse grooves and the inner groove walls opposing to the outer groove walls which is inclined with a certain angle from the opening end edge toward the groove bottom, respectively and whose chamfered width is gradually increased in the opposing orientations in the circumferential direction;

wherein, the groove bottom which forms the zigzag shape has a substantially uniform bottom width along its length; and wherein the groove including the groove bottom has a first portion of substantially uniform width extending upwardly from the groove bottom and a second portion which is above the first portion and in which the width of the groove gradually increases; and wherein the chamfered surface of the inner and the outer chamfered parts have a flat plane in an inverted triangle shape.

2. The pneumatic tire according to claim 1, wherein an angle formed by the inner chamfered part and the plane including the tire circumferential direction is within the range of 15 to 80 degrees measured from the acute-angle side.

3. The pneumatic tire according to claim 1, wherein an angle formed by the outer chamfered part and the surface including the tire circumferential direction is within the range of 15 to 80 degrees measured from the acute-angle side.

4. The pneumatic tire according to claim 1, wherein an angle formed by the inner end edge of the groove bottom located at the outermost circumferential groove between the adjacent transverse grooves and the surface including the tire circumferential direction is within the range of 5 to 45 degrees measured from the acute-angle side on the inner land portion side.

5. The pneumatic tire according to claim 1, wherein an angle formed by the outer end edge of the groove bottom of the outermost circumferential groove located between the adjacent transverse grooves and the surface including the tire circumferential direction is within the range of 5 to 45 degrees measured from the acute-angle side on the outer land portion side.

6. The pneumatic tire according to claim 1, wherein the at least a pair of circumferential grooves includes a pair of the outermost circumferential grooves located with the tire equatorial plane between them, and the groove bottoms of this pair of the outermost circumferential grooves located between the adjacent transverse grooves and a transverse groove extending to the opening at the tread end in communication with each of them are disposed so that they are entered within a ground contact area sequentially from the tire equator side to the tread end side at rolling of the tire load.

7. The pneumatic tire according to claim 1, wherein the groove bottom is substantially flat.

8. The pneumatic tire according to claim 1, wherein, in the first portion, opposing groove sidewalls are substantially parallel.

9. The pneumatic tire according to claim 8, wherein, in the first portion, the opposing groove sidewalls are substantially upright.

* * * * *